US008897542B2

(12) United States Patent
Wei

(10) Patent No.: US 8,897,542 B2
(45) Date of Patent: Nov. 25, 2014

(54) DEPTH MAP GENERATION BASED ON SOFT CLASSIFICATION

(75) Inventor: Jianing Wei, San Jose, CA (US)

(73) Assignee: Sony Corporation, Tokyo (JP)

(*) Notice: Subject to any disclaimer, the term of this patent is extended or adjusted under 35 U.S.C. 154(b) by 445 days.

(21) Appl. No.: 13/327,733

(22) Filed: Dec. 15, 2011

(65) Prior Publication Data

US 2013/0156294 A1 Jun. 20, 2013

(51) Int. Cl.
*G06K 9/00* (2006.01)
*G06T 7/00* (2006.01)

(52) U.S. Cl.
CPC .......... *G06T 7/0051* (2013.01); *G06K 9/00684* (2013.01)
USPC .......................................... 382/154; 382/224

(58) Field of Classification Search
None
See application file for complete search history.

(56) References Cited

U.S. PATENT DOCUMENTS

| 7,680,342 | B2* | 3/2010 | Steinberg et al. ............. 382/224 |
| 8,472,746 | B2* | 6/2013 | Wei et al. ..................... 382/264 |
| 8,520,935 | B2* | 8/2013 | Wang et al. ................... 382/154 |
| 8,565,512 | B2* | 10/2013 | Jung et al. .................... 382/154 |
| 2005/0053276 | A1* | 3/2005 | Curti et al. .................... 382/154 |
| 2008/0150945 | A1* | 6/2008 | Wang et al. ................... 345/427 |
| 2009/0116732 | A1* | 5/2009 | Zhou et al. .................... 382/154 |
| 2010/0014781 | A1* | 1/2010 | Liu et al. ....................... 382/285 |
| 2010/0026784 | A1* | 2/2010 | Burazerovic .................. 348/46 |
| 2011/0026840 | A1* | 2/2011 | Tao et al. ...................... 382/224 |
| 2012/0002862 | A1* | 1/2012 | Mita et al. .................... 382/154 |
| 2012/0183202 | A1* | 7/2012 | Wei et al. ..................... 382/154 |

OTHER PUBLICATIONS

Battiato et al. (2004) "Depth-map generation by image classification." Proc. SPIE vol. 5302, pp. 95-104.*
Burazerovic et al. (Nov. 2009) "Automatic depth profiling of 2d cinema—and photographic images." Proc. 2009 IEEE Int'l Conf. on Image Processing, pp. 2365-2368.*
Lin et al. (Nov. 2011) "2d to 3d image conversion based on classification of background depth profiles." LNCS 7088, pp. 381-392.*
Liu et al. (Jun. 2010) "Single image depth estimation from predicted semantic labels." Proc. 2010 IEEE Conf. on Computer Vision and Pattern Recognition, pp. 1253-1260.*

* cited by examiner

*Primary Examiner* — Barry Drennan
(74) *Attorney, Agent, or Firm* — Haverstock & Owens LLP

(57) ABSTRACT

A method for generating a depth map for a 2D image and video includes receiving the 2D image and video; defining a plurality of object classes; analyzing content of the received 2D image and video; calculating probabilities that the received 2D image belongs to the object classes; and determining a final depth map based on a result of the analyzed content and the calculated probabilities for the object classes.

17 Claims, 10 Drawing Sheets

DEPTH MAP GENERATION BASED ON SOFT CLASSIFICATION

TECHNICAL FIELD

The present disclosure relates to methods and systems for generating a depth map based on soft classification that may be used for converting an image in a two-dimensional ("2D") format into an image in a three-dimensional format ("3D").

BACKGROUND

Rapidly emerging 3D technologies, in the form of 3D cinemas, 3D home entertainment devices, and 3D portable electronics, has created increasing demand for 3D content. One popular way of creating 3D content is to leverage and convert the large existing database of 2D media into 3D. The conversion of image data from 2D to 3D, a fast way to obtain 3D content from existing 2D content, has been extensively studied. One of the methods to convert 2D into 3D is to first generate a depth map, and create left and right eye images from the depth map. This 3D rendering method based on depth map is useful for multi-view stereoscopic system, and is also well-suited for efficient transmission and storage.

In converting 2D images into 3D images, most conventional technologies apply a same method to different images, regardless of the type of content in the images. The lack of a customized method in these technologies may either create unsatisfactory 3D effects for certain content, or significantly increase the computational complexity required.

To use customized methods for different types of scenes, a classification-based algorithm has been proposed that seeks to improve over conventional 2D to 3D image conversion technologies. This algorithm classifies the image into different categories, and uses different methods to generate the depth map for different image categories. In this algorithm, known as "hard classification," each image is assigned a fixed class label which possesses a unique property, and the depth map is generated using the method that is suitable only for that class.

However, the hard classification method may lead to several problems. First, some images may not be strictly classified as belonging to a single class, and therefore the depth map generated according to the property of a single class for these images may not be optimal. Second, the non-optimally generated depth map in a misclassified image may lead to 3D image distortion. Lastly, misclassification of images may lead to temporal flickering of depth maps during the conversion of individual frames in video sequences, which may result in visually unpleasant 3D perception.

SUMMARY

The present disclosure includes an exemplary method and system for generating a depth map for a 2D image based on soft classification.

Embodiments of the method include receiving the 2D image, defining a plurality of object classes, analyzing content of the received 2D image, calculating probabilities that the received 2D image belongs to the object classes, and determining a final depth map based on a result of the analyzed content and the calculated probabilities for the object classes. Some embodiments of the method may include performing a multi-stage classification, for example, a multi-stage two-class classification, of the received 2D image if there are more than two object classes in the plurality of object classes. Other embodiments may include applying a filter, for example, an infinite impulse response filter, to smooth the calculated probabilities for the object classes if the received 2D image is a fast action scene, so as to prevent temporal flickering in the final depth map.

An exemplary system in accordance with the present disclosure comprises a user device receiving a 2D image, and a 2D-to-3D image converter coupled to the user device. The 2D-to-3D image converter analyzes content of the received 2D image, calculates the probabilities that the received 2D image belongs to a plurality of object classes, and determines a final depth map based on a result of the analyzed content and the calculated probabilities for the object classes. In some embodiments, the 2D-to-3D image converter applies a filter, for example, an infinite impulse response filter, to smooth the calculated probabilities for the object classes if the received 2D image is a fast action scene, so as to prevent temporal flickering in the final depth map. In certain embodiments, the 2D-to-3D image converter generates a 3D image by applying the final depth map to the received 2D image.

It is to be understood that both the foregoing general description and the following detailed description are exemplary and explanatory only and are not restrictive of the invention, as claimed.

DETAILED DESCRIPTION

Reference will now be made in detail to the exemplary embodiments illustrated in the accompanying drawings. Wherever possible, the same reference numbers will be used throughout the drawings to refer to the same or like parts.

Methods and systems disclosed herein address the above described needs. For example, methods and systems disclosed herein can generate depth maps based on content and features of 2D images (e.g., single still images or video frames), by utilizing efficient algorithms with low computational complexity suitable for real-time implementation, even on low-power computing devices and/or 3D display devices.

Figure 1:
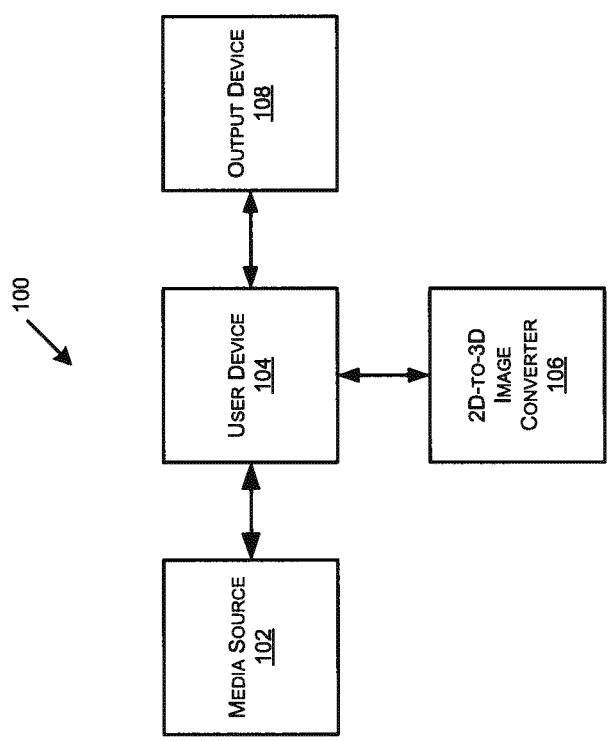
FIG. 1 illustrates a block diagram of an exemplary system consistent with the invention.

FIG. 1 illustrates a block diagram of an exemplary system 100 consistent with the invention. As shown in FIG. 1, exemplary system 100 may comprise a media source 102, a user device 104, a 2D-to-3D image converter 106, and an output device 108. Each of the components is operatively connected to one another via a network or any type of communication links that allow transmission of data from one component to another. The network may include Local Area Networks (LANs) and/or Wide Area Networks (WANs), and may be wireless, wired, or a combination thereof.

Media source 102 can be any type of storage medium capable of storing imaging data, such as video or still images. For example, media source 102 can be provided as a CD, DVD, Blu-ray disc, hard disk, magnetic tape, flash memory card/drive, volatile or non-volatile memory, holographic data storage, and any other type of storage medium. Media source 102 can also be an image capturing device or computer capable of providing imaging data to user device 104. For example, media source 102 can be a camera capturing imaging data and providing the captured imaging data to user device 104.

As another example, media source 102 can be a web server, an enterprise server, or any other type of computer server. Media source 102 can be computer programmed to accept requests (e.g., HTTP, or other protocols that can initiate data transmission) from user device 104 and to serve user device 104 with requested imaging data. In addition, media source 102 can be a broadcasting facility, such as free-to-air, cable, satellite, and other broadcasting facility, for distributing imaging data.

As further example, media source 102 can be a client computing device. Media source 102 can request a server (e.g., user device 104 or 2D-to-3D image converter 106) in a data network (e.g., a cloud computing network) to convert a 2D image into a 3D image.

User device 104 can be, for example, a computer, a personal digital assistant (PDA), a cell phone or smartphone, a laptop, a desktop, a tablet PC, a media content player, a set-top box, a television set including a broadcast tuner, a video game station/system, or any electronic device capable of providing or rendering imaging data. User device 104 may include software applications that allow user device 104 to communicate with and receive imaging data from a network or local storage medium. As mentioned above, user device 104 can receive data from media source 102, examples of which are provided above.

As another example, user device 104 can be a web server, an enterprise server, or any other type of computer server. User device 104 can be a computer programmed to accept requests (e.g., HTTP, or other protocols that can initiate data transmission) from, e.g., media source 102, for converting an image into a 3D image, and to provide the 3D image generated by 2D-to-3D image converter 106. In addition, user device 104 can be a broadcasting facility, such as free-to-air, cable, satellite, and other broadcasting facility, for distributing imaging data, including imaging data in a 3D format.

As shown in FIG. 1, 2D-to-3D image converter 106 can be implemented as a software program executing in a processor and/or as hardware that performs a 2D-to-3D image conversion based on image content. A 2D image can be one of video frames or still images in a 2D format, can be in color, black/white, or grayscale, and can be in one color space or another color space. In some embodiments, 2D-to-3D image converter 106 can, for example, analyze content of a 2D image, generate a depth map corresponding to the content, and convert the 2D image into a 3D image based on the depth map. The depth map generation and 2D-to-3D image conversion will be further described below.

Output device 108 can be, for example, a computer, personal digital assistant (PDA), cell phone or smartphone, laptop, desktop, a tablet PC, media content player, set-top box, television set including a broadcast tuner, video game station/system, or any electronic device capable of accessing a data network and/or receiving imaging data. In some embodiments, output device 108 can be a display device such as, for example, a television, monitor, projector, digital photo frame, display panel, or any other display device. In certain embodiments, output device 108 can be a printer.

While shown in FIG. 1 as separate components that are operatively connected, any or all of media source 102, user device 104, 2D-to-3D image converter 106, and output device 108 may be co-located in one device. For example, media source 102 can be located within or form part of user device 104 or output device 108, 2D-to-3D image converter 106 can be located within or form part of media source 102, user device 104, or output device 108, and output device 108 can be located within or form part of user device 104 or media source 102. It is understood that the configuration shown in FIG. 1 is for illustrative purposes only. Certain components or devices may be removed or combined and other components or devices may be added.

Figure 2A:
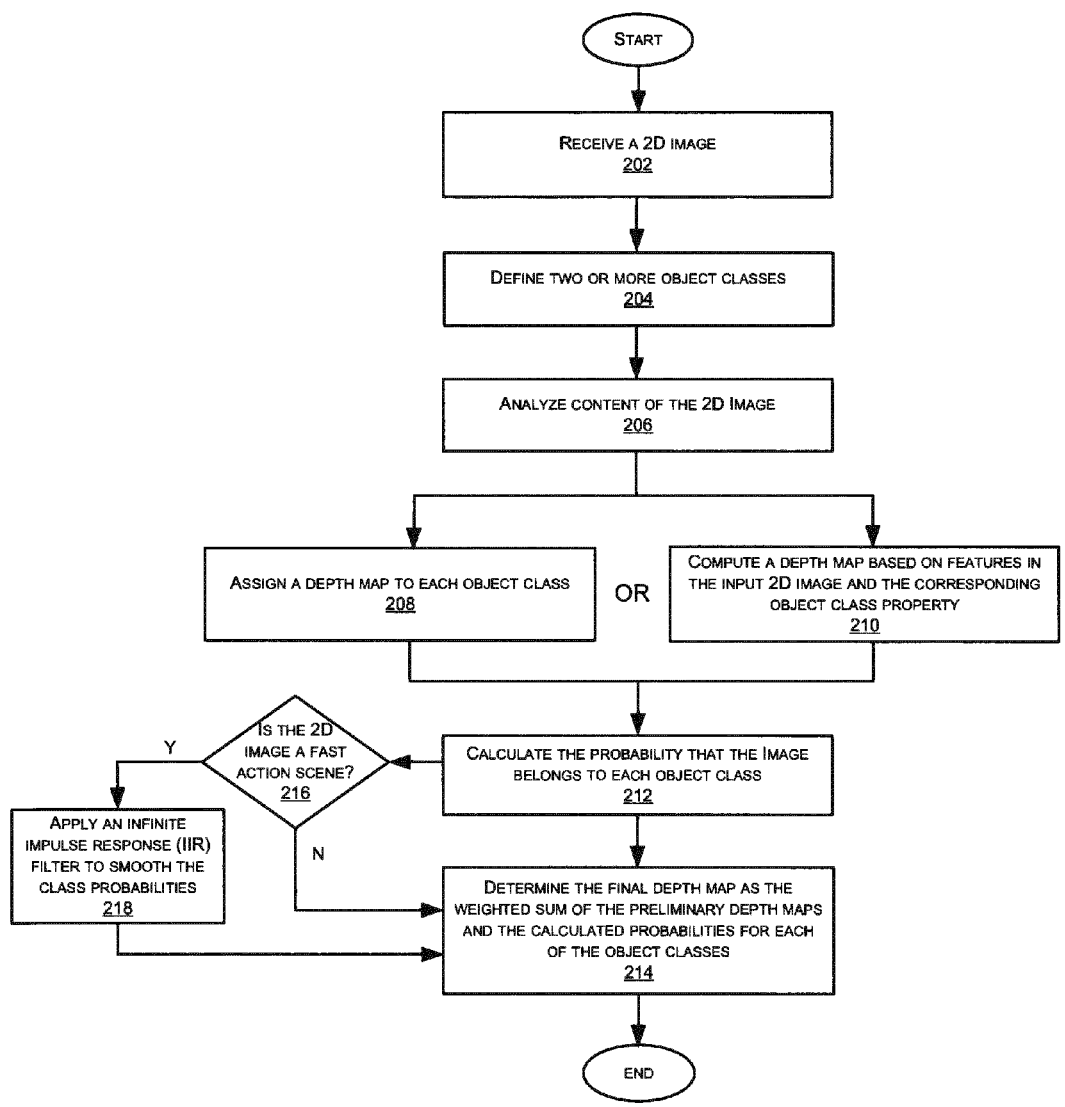
FIG. 2A is a flow chart illustrating an exemplary method for depth map generation based on soft classification.

FIG. 2A is a flow chart illustrating an exemplary method for depth map generation based on "soft classification." Soft classification is an algorithm-based approach wherein the received 2D image is not assigned a discrete class label, unlike in the hard classification method. In soft classification, the probabilities of the image belonging to different object classes are calculated, and the final depth map is generated by computing the weighted sum of preliminary depth maps and the calculated probabilities for the object classes.

Referring to FIG. 2A, a 2D image is received (step 202). Two or more object classes, in the form of image categories or subcategories, are defined (step 204). The object classes may be defined by the user, either before or after receiving the image, or preset in a program. Content of the 2D image is then analyzed (step 206). Content analysis may include comparing the image against a number of defined object classes, image categorization (or classification), and so forth. Based on a result of the content analysis, a preliminary depth map may be assigned to each object class (step 208), or computed for each object class based on features in the input 2D image and the corresponding object class property (step 210). The probability that the image belongs to each object class is calculated (step 212). The final depth map is generated by computing the weighted sum of the preliminary depth maps and the calculated probabilities for the object classes (step 214). In some other embodiments, it is determined whether the 2D image is a fast action scene (step 216). If the 2D image comprises a fast action scene, the object class probabilities may fluctuate widely between frames and cause temporal flickering in the final depth map. A filter, for example, an infinite impulse response filter, may be applied to smooth the object class probabilities (step 218) to prevent temporal flickering in the final depth map. In some embodiments, a 3D image may be generated based on the final depth map.

Mathematical classifiers are used to calculate the probability that the image belongs to each object class. In some embodiments, for example, a support vector machine (SVM) classifier is used to calculate class probabilities for two-class classifications. Class probabilities are obtained either by a linear or nonlinear mapping of the SVM decision function value, or by binning the SVM decision function value and estimating the probabilities based on empirical histograms. Through a linear mapping of the SVM decision function value, the class probability p may be defined as, for example, $$p(C=1\mid S=s) = \begin{cases} p_+, & s>1 \\ \frac{1+s}{2}p_+ + \frac{1-s}{2}p_-, & -1\leq s\leq 1 \\ p_-, & s<-1 \end{cases}$$

where C is the class label in a two-class classification problem, S is the SVM decision function value, and $$p_+ = \frac{p(S>1\mid C=1)}{p(S>1\mid C=1)+p(S>1\mid C=-1)}$$

$$p_- = \frac{p(S<-1\mid C=1)}{p(S<-1\mid C=1)+p(S<-1\mid C=-1)}$$

Since the decision function values of S above 1 or below −1 are not reliable for estimating the class probability, the class probability estimates $p_+$ and $p_-$ corresponding to decision function values S>1 and S<−1 are held constant. Class probability estimates $p_+$ and $p_-$ may be obtained from training data. For example, M number of images may be taken in class 1 to compute the SVM decision function values. If $M_+$ is the number of images in which decision function values exceed 1, then the estimate of p(S>1|C=1) is given by $M_+$/M. To obtain good probability estimates, a large number of images may be required. Nevertheless, when a large image database is not available, estimates for $p_+$ and $p_-$ may be assigned based on previously collected or known empirical data.

In images with fast action scenes, the class probabilities may fluctuate widely between frames. As such, the class probabilities may need to be smoothed to avoid depth map temporal flickering in the final depth map. A filter, for example, an Infinite Impulse Response (IIR) filter, may be used to smooth the class probabilities. The smoothing filter may be described by the following equation:

$$p^*(i)=w_1 p^*(i-1)+w_2 p^*(i-2)+w_0 p(i)$$

In the above equation, p(i) represents the unsmoothed class probability for frame i, p*(i) represents the smoothed class probability for frame i, and the weights $w_0$, $w_1$, $w_2$ are positive and sum up to 1.

Any types and any number of image classifications consistent with disclosed embodiments may be used. Further, depth map generation based on soft classification using SVM classifier is only one example of depth map generation based on the weighted sum of the preliminary depth maps and calculated probabilities for the object classes. Other methods consistent with the present disclosure may also be adopted to implement depth map generation based on soft classification for 2D-to-3D image conversion.

Figure 2B:
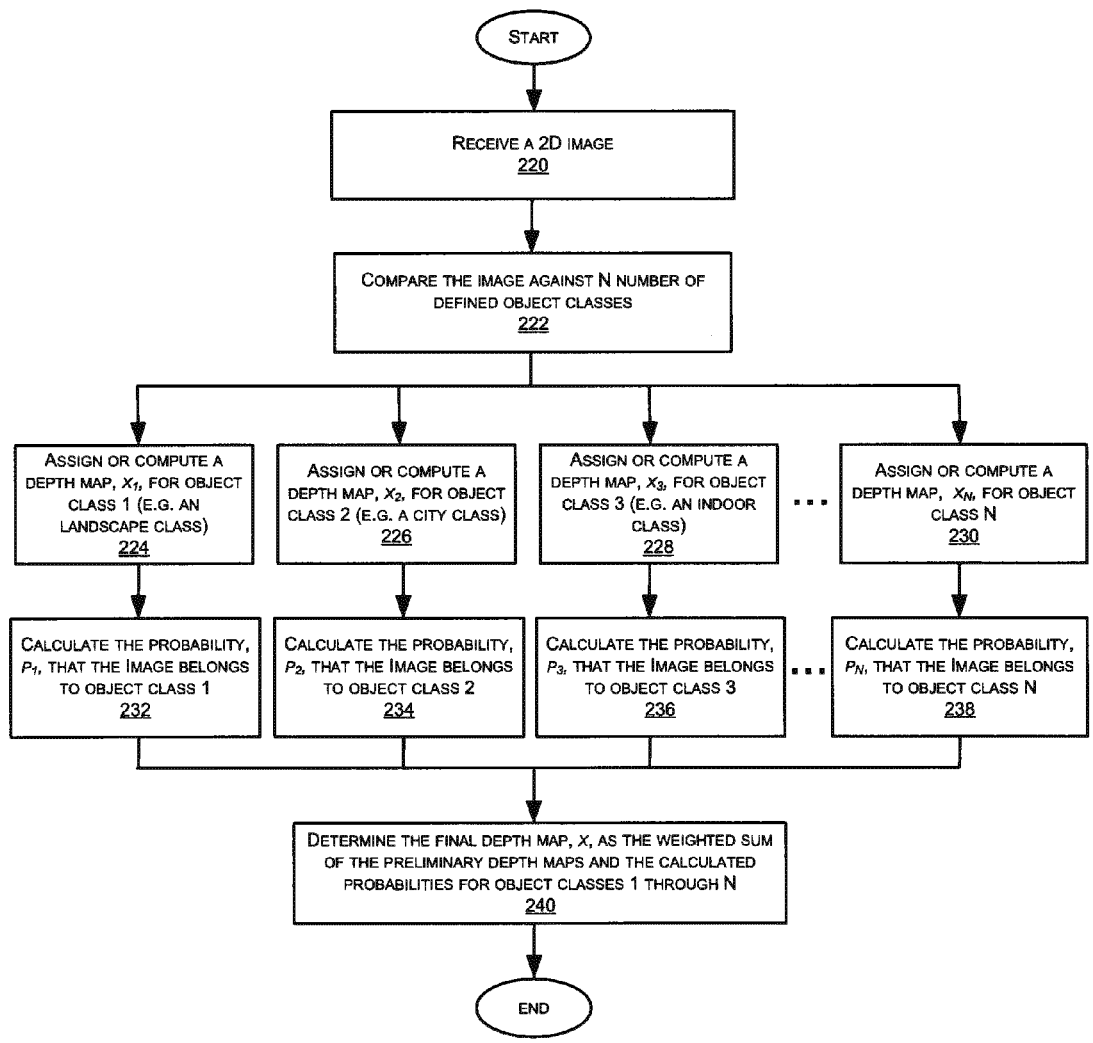
FIG. 2B is a flow chart further illustrating an exemplary method for depth map generation based on soft classification using different object classes.

FIG. 2B is a flow chart illustrating an exemplary method for depth map generation based on soft classification using different object classes. A 2D image is received (step 220). The image is then compared against N number of defined object classes (step 222). In some embodiments, a preliminary depth map $x_c$ may be assigned to each object class, from class 1 and so forth through class N (steps 224, 226, 228, and 230), or computed for each object class based on features in the input 2D image and the corresponding object class property. The object classes may comprise of semantically meaningful categories and/or subcategories. For example, class 1 may comprise a landscape class, class 2 may comprise a city class, class 3 may comprise an indoor class, and so forth. A class probability $p_c$ is also calculated for each object class (steps 232, 234, 236, and 238). In some embodiments, a SVM classifier may be used to calculate the class probability $p_c$. Lastly, the final depth map x is computed as the weighted sum of the preliminary depth maps and the calculated probabilities for the object classes (step 240) as follows:

$$x = \sum_{c=1}^{N} x_c p_c$$

If the final depth map x and the class label c are treated as unknown random variables, it can be shown mathematically that the weighted combination of preliminary depth maps is the Minimum Mean Square Error (MMSE) estimate of the final depth map, assuming the preliminary depth map $x_0$ generated from class c is the expected value of the depth given that the image is in class c. The MMSE estimate of X based on observation Y=y is defined by $$E[X\mid Y=y]=\int x\cdot p(x\mid Y=y)dx,$$

where p(x|Y=y) is the probability density function of depth X given the 2D image Y=y, and $$p(x\mid Y=y) = \sum_{c=1}^{N} p(x\mid C=c, Y=y)p(C=c\mid Y=y).$$

Thus, the MMSE estimate can be written as $$E[X\mid Y=y] = \int x\cdot \sum_{c=1}^{N} p(x\mid C=c, Y=y)p(C=c\mid Y=y)\,dx$$

$$= \sum_{c=1}^{N}\left(\int x\cdot p(x\mid C=c, Y=y)dx\right)\cdot p(C=c\mid Y=y)$$

$$= \sum_{c=1}^{N} E[X\mid C=c, Y=y]p(C=c\mid Y=y)$$

where E[X|C=c, Y=y] is the expected depth given that the 2D image Y=y and that the image belongs to class c, and p(C=c|Y=y) is the class probability given the 2D image. If the estimated preliminary depth $x_c$ for class C=c is assumed to be the expected depth E[X|C=c, Y=y], then the computed depth estimate shown in the previous equation is the MMSE of the final depth.

With reference to FIG. 2B, the preliminary depth map $x_c$ may be generated by applying properties specific to the object class. In some embodiments, for example, to generate the preliminary depth map for a landscape object class (step 224), the dark channel cue may be used. Similarly, perspective cues such as vanishing lines may be used to generate the preliminary depth map for a city object class (step 226).

In some embodiments, for example, a landscape object class may comprise landscape images containing natural scenes having vertically changing depths, while a city object class may comprise images of man-made objects such as buildings, roads, etc. Therefore, a city object class may have characteristics pertaining to strong vertical and horizontal edges, while a landscape object class may be differentiated by its randomly distributed edge directions. Accordingly, the edge direction distribution may be one of visual features distinguishing a landscape object class from a city object class. In some embodiments, an edge direction histogram may be employed for image classification. In certain embodiments, various classifiers, e.g., a Gaussian Bayes classifier, may be used to perform the classification based on the edge direction histogram.

In other embodiments, after a 2D image is classified as one of image categories (or classes), it may be further classified as one of subcategories (or subclasses) of the image categories. For example, in some embodiments, if a 2D image is classified as a structure image, it may be further classified as, e.g., an indoor image or a city image (also called an outdoor image). A city image is a picture taken outside and its main contents are man-made structures, such as buildings, cars, and so forth. A city image tends to have uniform spatial lighting/color distribution. For example, in the city image, a sky may be blue and on a top of the image, while a ground is at a bottom of the image. On the other hand, an indoor image tends to have more varied color distributions. Therefore, in some embodiments, spatial color distribution features may be used to distinguish between an indoor image and a city image. In some embodiments, a color histogram may be employed for the image classification. In certain embodiments, various classifiers, e.g., a support vector machine, may be used to perform the classification based on the color histogram.

For each image category, a different method may be developed or chosen to generate its respective depth map. The rationale behind this classification is that geometric structures in different categories may be different, and depth assignment can be done in different ways. A depth map may be represented as a grayscale image with an intensity value of each pixel registering its depth. Then, an appropriate disparity between left and right eye images (which is also called parallax) may be calculated from the depth map. An image may contain different categories of sub-images arranged in different layouts. Accordingly, the method used to reconstruct a depth map may vary with the content of an image. Thus, in some embodiments, depth map generation may be based on an understanding of image content, e.g., image classification (and/or subclassification), and so forth.

Figure 3:
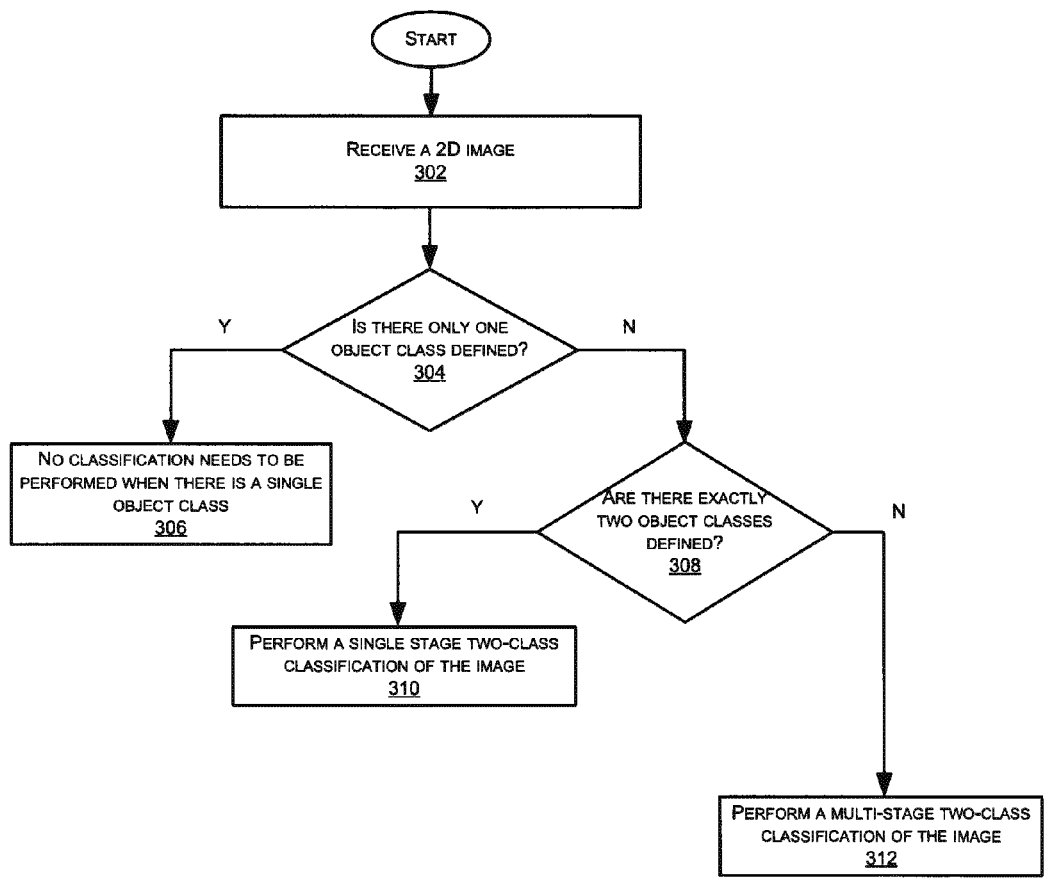
FIG. 3 is a flow chart illustrating an exemplary method for depth map generation based on the number of defined object classes.

FIG. 3 is a flow chart illustrating an exemplary method for depth map generation based on the number of defined object classes. After a 2D image is received (step 302), the number of object classes is determined (step 304). If only one object class is defined, it is not necessary to calculate a class probability (step 306). In this case, the depth map generated for the input image in the single object class is the final depth map.

Referring back to FIG. 3, if there is more than one object class, it is determined whether exactly two or more object classes are defined (step 308). If exactly two object classes are defined, a single stage two-class classification of the image is performed (step 310). If more than two object classes are defined, a multi-stage two-class classification of the image is performed (step 312).

In a single stage two-class classification, the probabilities that the image belongs to the two object classes are calculated in a single stage. Preliminary depth maps may be assigned to the object classes, or computed for the object classes based on features in the input 2D image and the corresponding object class properties. The final depth map is then computed as the weighted sum of the preliminary depth maps and the calculated probabilities for the object classes.

In a multi-stage two-class classification, the probabilities for a first two object classes are calculated in a first stage, and the probabilities for other object classes are calculated in subsequent stages. The calculated probabilities are then combined to determine the probabilities that the received 2D image belongs to each of a plurality of combinations of object classes from the different stages. In some embodiments, for example, the probabilities calculated in different stages may be combined to yield the probabilities for different combinations of object classes. Subsequent stages may also include a second stage, a third stage, and so forth. Similar to the single stage two-class classification, preliminary depth maps may be assigned or computed for the object classes as described above. The final depth map is then computed as the weighted sum of the preliminary depth maps and the calculated probabilities for the object classes or combinations of object classes across the stages.

Figure 4:
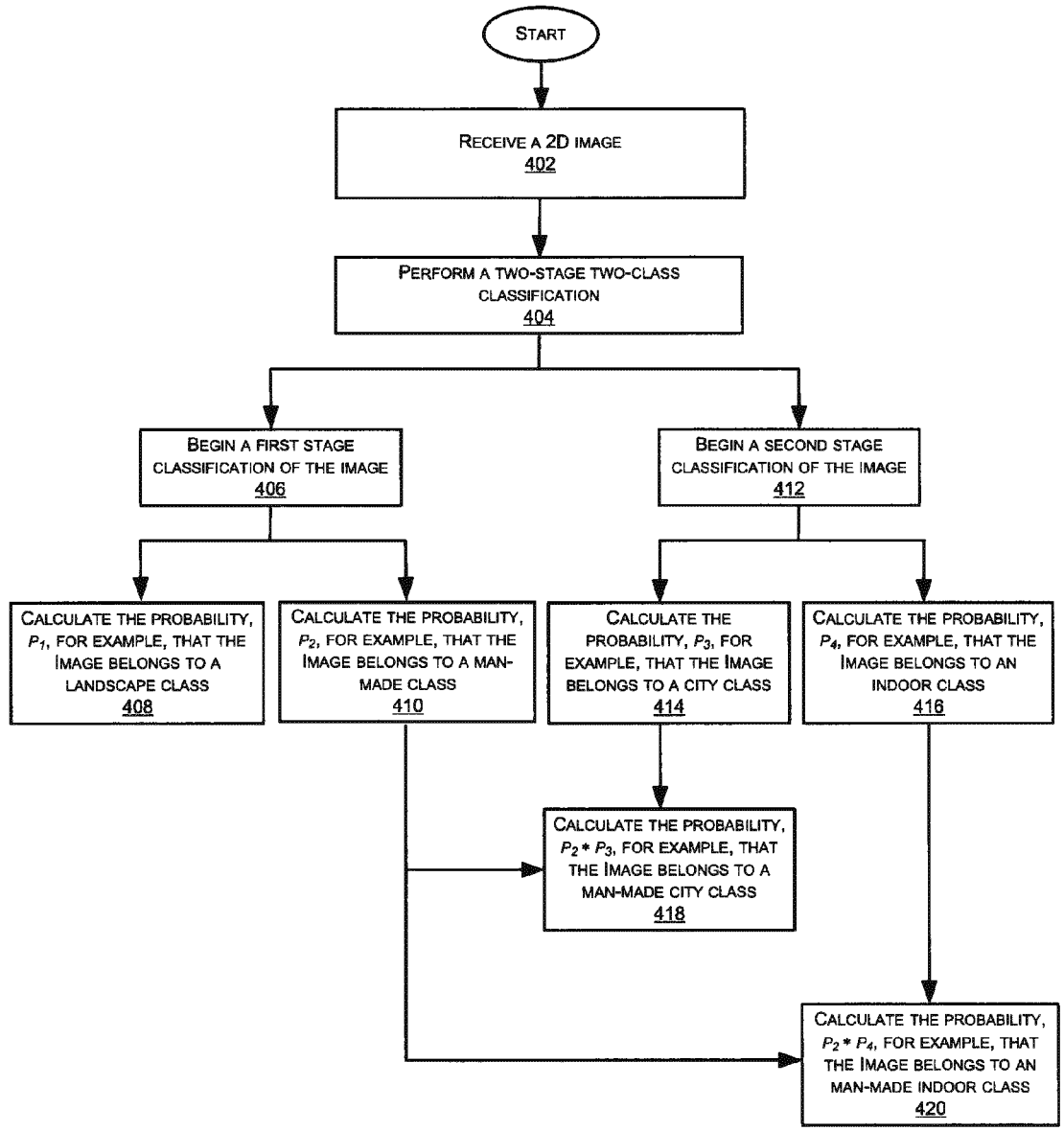
FIG. 4 is a flow chart illustrating an exemplary method for depth map generation based on a two-stage two-class classification of the image.

FIG. 4 shows an embodiment of a multi-stage two-class classification. Specifically, FIG. 4 is a flow chart illustrating an exemplary method for depth map generation based on a two-stage two-class classification of the image. A 2D image is received (step 402). Four object classes are defined, and the image is compared against each object class in a two-stage two-class classification (step 404). In the first stage classification (step 406), the probability that the image belongs to object class 1 and object class 2 is calculated, and given by $p_1$ and $p_2$ respectively (steps 408 and 410). In some embodiments, for example, object class 1 may comprise a landscape class, and object class 2 may comprise a man-made class. In the second stage classification (step 412), the probability that the image belongs to object class 3 and object class 4 is calculated, and given by $p_3$ and $p_4$ respectively (steps 414 and 416). In some embodiments, for example, object class 3 may comprise a city class, and object class 4 may comprise an indoor class.

Referring back to FIG. 4, the class probabilities calculated in the first and second stage classifications are then combined. For example, in step 418, the probability that the image belongs to a combination of object classes 2 and 3 is given by the product of the class probabilities $p_2*p_3$. Using the embodiments as described above, if object class 2 is a man-made class and object class 3 is a city class, $p_2*p_3$ yields the probability that the image belongs to a man-made city class. Similarly, in step 420, the probability that the image belongs to a combination of object classes 2 and 4 is given by the product of the class probabilities $p_2*p_4$. If object class 2 is a man-made class and object class 4 is an indoor class, $p_2*p_4$ yields the probability that the image belongs to a man-made indoor class.

The object classes of landscape, man-made, city, and indoor images are only exemplary image classifications. Any type and any number of image classifications consistent with the disclosed embodiments may be used. The number of image object classes may be expanded within the disclosed framework, so that higher quality depth maps may be generated for more images having a variety of contents. In addition, any combination of the class probabilities in the different stages may be calculated. By combining the class probabilities across the different stages, the probabilities that the image belongs to different combinations of object classes may be calculated, and the final depth map determined as a weighted sum of the preliminary depth maps and the calculated probabilities for the object classes or combinations of object classes across the stages. The use of different combinations of object classes may further refine the final depth map.

It is understood that the above-described exemplary process flows in FIGS. 2A-2B, 3, and 4 are for illustrative purposes only. Certain steps may be deleted, combined, or rearranged, and additional steps may be added.

Figure 5:
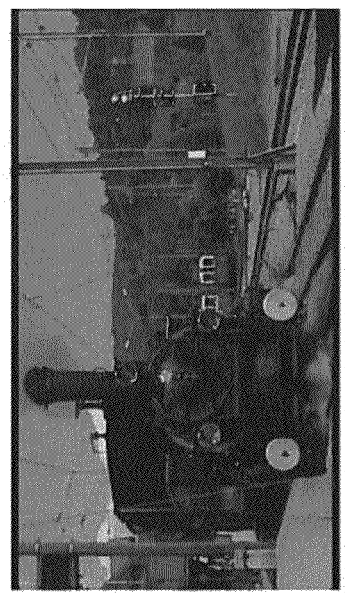
FIG. 5 illustrates an exemplary 2D city image which also contains landscape properties.
Figure 7:
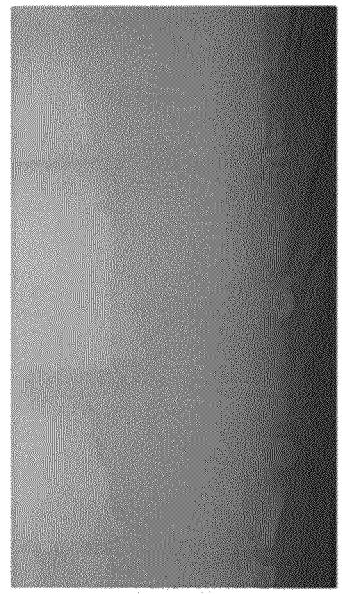
FIG. 7 illustrates an exemplary depth map for the image of FIG. 5 based on the soft classification method of FIG. 3.
Figure 6:
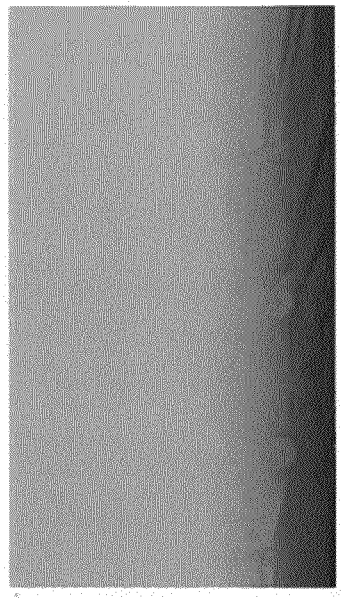
FIG. 6 illustrates an exemplary depth map for the image of FIG. 5 based on the hard classification method of FIG. 3.

FIG. 5 illustrates an exemplary 2D city image which also contains landscape properties. FIG. 6 illustrates an exemplary generated depth map for the image of FIG. 5 based on hard classification, and FIG. 7 illustrates an exemplary generated depth map for the image of FIG. 5 based on soft classification.

Figure 8:
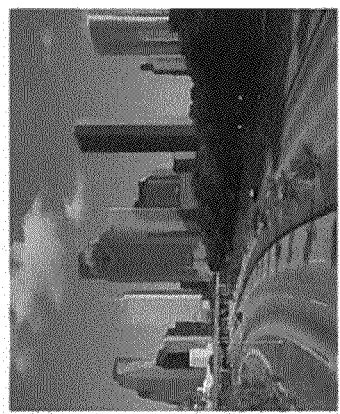
FIG. 8 illustrates an exemplary 2D city image which also contains landscape properties.
Figure 10:
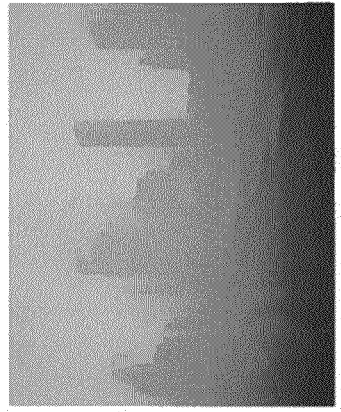
FIG. 10 illustrates an exemplary depth map for the image of FIG. 8 based on the soft classification method of FIG. 3.
Figure 9:
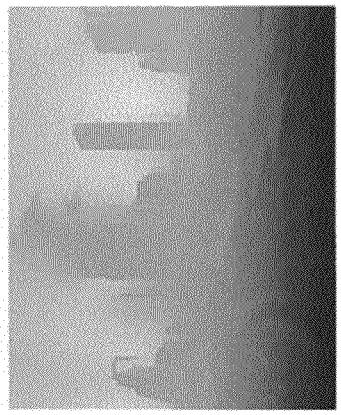
FIG. 9 illustrates an exemplary depth map for the image of FIG. 8 based on the hard classification method of FIG. 3.

For further example, FIG. 8 illustrates an exemplary 2D city image which also contains landscape properties. FIG. 9 illustrates an exemplary generated depth map for the image of FIG. 8 based on hard classification, and FIG. 10 illustrates an exemplary generated depth map for the image of FIG. 8 based on soft classification.

Figure 11:
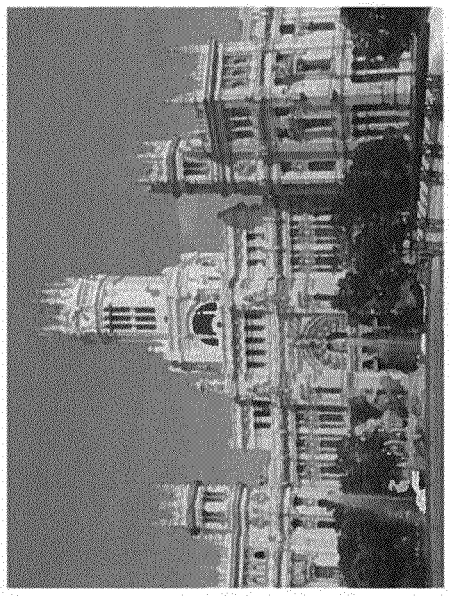
FIG. 11 illustrates an exemplary 2D city image that has been misclassified as an indoor image.
Figure 13:
FIG. 13 illustrates an exemplary depth map for the image of FIG. 11 based on the soft classification method of FIG. 3.
Figure 12:
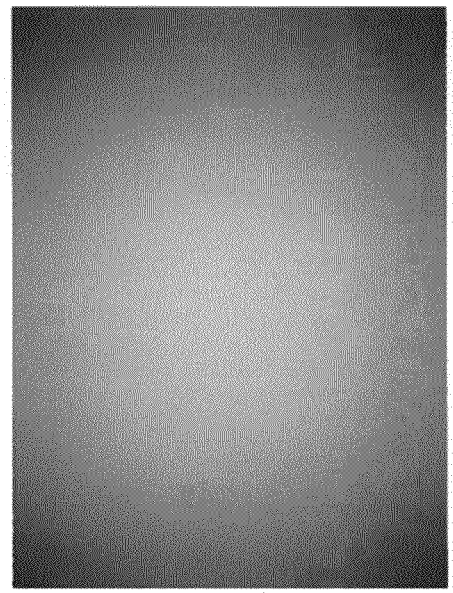
FIG. 12 illustrates an exemplary depth map for the image of FIG. 11 based on the hard classification method of FIG. 3.

FIG. 11 illustrates an exemplary 2D city image that has been misclassified as an indoor image. FIG. 12 illustrates an exemplary generated depth map for the image of FIG. 11 based on hard classification, and FIG. 13 illustrates an exemplary generated depth map for the image of FIG. 11 based on soft classification.

Figure 14:
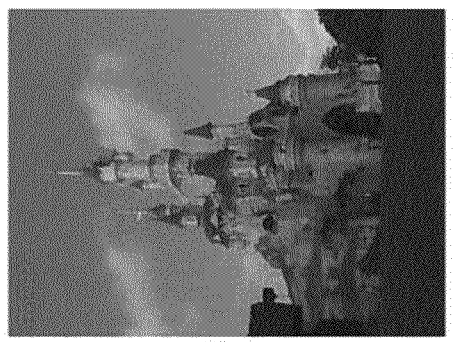
FIG. 14 illustrates an exemplary 2D city image that has been misclassified as an indoor image.
Figure 16:
FIG. 16 illustrates an exemplary depth map for the image of FIG. 14 based on the soft classification method of FIG. 3.
Figure 15:
FIG. 15 illustrates an exemplary depth map for the image of FIG. 14 based on the hard classification method of FIG. 3.

For further example, FIG. 14 illustrates an exemplary 2D city image that has been misclassified as an indoor image. FIG. 15 illustrates an exemplary generated depth map for the image of FIG. 14 based on hard classification, and FIG. 16 illustrates an exemplary generated depth map for the image of FIG. 14 based on soft classification.

It can be seen from FIGS. 5-7 and 8-10 that the soft classification method consistently produces better depth maps compared to the hard classification method. The robustness of the soft classification method is also evident when a 2D image has been misclassified into an inappropriate object class using hard classification, as seen in FIGS. 11-13 and 14-16.

Figure 17:
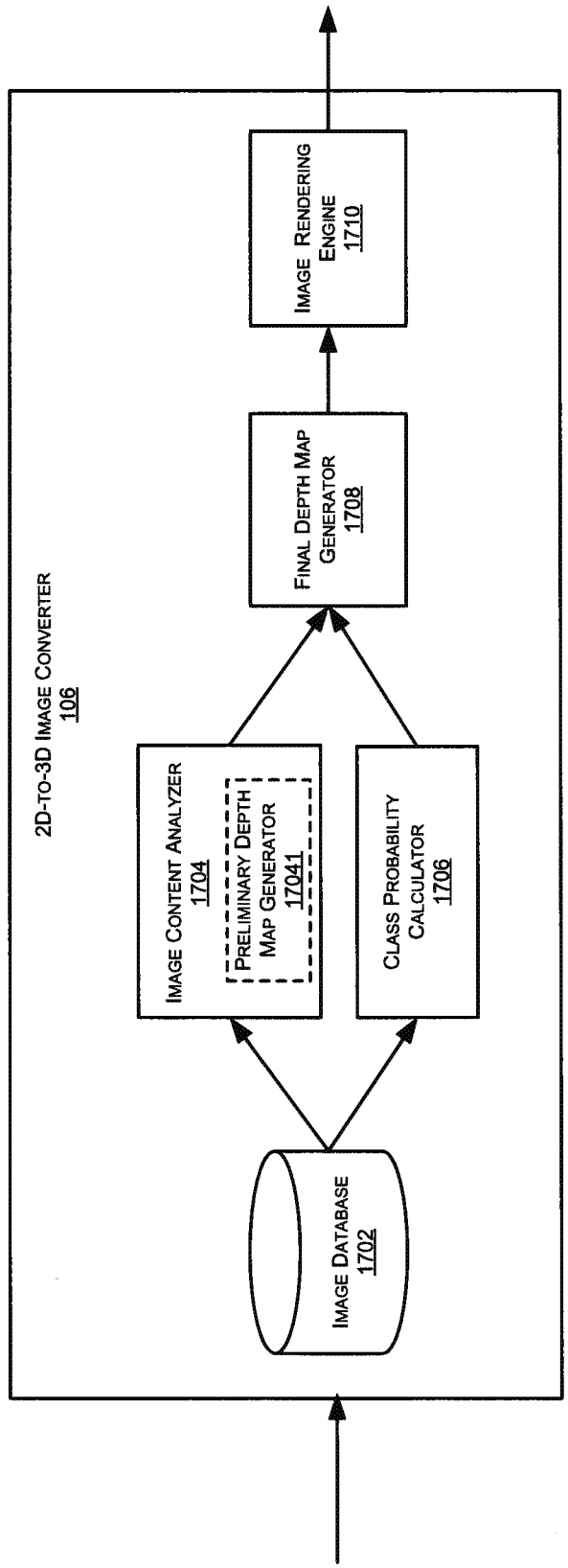
FIG. 17 is a block diagram illustrating an exemplary 2D-to-3D image converter 106 in the exemplary system 100 of FIG. 1.

FIG. 17 is a block diagram illustrating an exemplary 2D-to-3D image converter 106 in the exemplary system 100 of FIG. 1. In some embodiments, 2D-to-3D image converter 106 may include, for example, an image content analyzer 1704, a class probability calculator 1706, a final depth map generator 1708, and an image rendering engine 1710. In certain embodiments, 2D-to-3D image converter 106 may also include an image database 1702.

It is understood that components of 2D-to-3D image converter 106 shown in FIG. 17 are for illustrative purposes only. Certain components may be removed or combined and other components may be added. Also, one or more of the components depicted in FIG. 17 may be implemented in software on one or more computing systems. For example, such components may comprise one or more software applications, which may comprise one or more computer units including storage devices containing computer-readable instructions which, when executed by a processor, cause a computer to perform steps of a method. Computer-readable instructions may be stored on a tangible non-transitory computer-readable medium, such as a solid-state memory or disk memory. Alternatively, one or more of the components depicted in FIG. 17 may be implemented in hardware components or combinations of hardware and software such as, for example, ASICs, special purpose computers, or general purpose computers.

With reference to FIG. 17, 2D-to-3D image converter 106 receives a 2D image, e.g., a still image or a frame of a video. The 2D image may be stored in the image database 1702.

Image content analyzer 1704 may analyze content of the 2D image, as described above. The content analysis may include, for example, comparing the image against a number of defined object classes. The content analysis may also include image categorization (or classification), and so forth. Based on a result of the content analysis, a preliminary depth map may be assigned to each object class, or may be computed for each object class based on features in the input 2D image and the corresponding object class property.

Image database 1702 may be used for storing a collection of data related to depth map generation for 2D-to-3D image conversion. The storage may be organized as a set of queues, a structured file, a flat file, a relational database, an object-oriented database, or any other appropriate database. Computer software, such as a database management system, may be utilized to manage and provide access to the data stored in image database 1702. Image database 1702 may store, among other things, configuration information for image content analysis, configuration information for depth map generation methods corresponding to content of images, configuration information for generating 3D images based on depth maps, etc.

The configuration information for image content analysis may include but is not limited to, for example, image classes/subclasses, and/or methods for the above-described image categorization/subcategorization, or any other type of image content analysis. The configuration information for depth map generation methods may include but is not limited to, for example, methods for generating depth information based on results of content analysis (e.g., image categorization/subcategorization), as described above, or depth models such as a simple sphere model or any other more sophisticated 3D depth model corresponding to image content, and so forth.

With reference to FIG. 17, image analyzer 1704 analyzes content of the 2D image, as described above, based on the configuration information for image content analysis, which may be acquired from, e.g., image database 1702. The image analyzer 1704 may further comprise a preliminary depth map generator 17041. The analysis results are passed to the preliminary depth map generator 17041, which determines or chooses from, e.g., image database 1702, a corresponding method for generating a preliminary depth map based on the analysis result, as described above. The preliminary depth map generator may employ the chosen method to generate a preliminary depth map, as described above. In some embodiments, the preliminary depth map generator may assign preliminary depth maps to the object classes, or compute preliminary depth maps for the object classes based on features in the input 2D image and the corresponding object class properties, wherein the 2D image features and object class properties reside as configuration information stored in the image database 1702.

The class probability calculator 1706 computes the probability of the 2D image belonging to each of the object classes. This computation may be performed, for example, using a SVM classifier, in a single stage or multi-stage two-class classification method, as described above. The class probability calculator 1706 may further comprise a filter, for example, an infinite impulse response filter, to smooth the calculated probabilities to prevent temporal flickering in the final depth map if the 2D image is a fast action scene.

The content analysis from image analyzer 1704 and the class probabilities calculated in class probability calculator 1706 are provided to the final depth map generator 1708. The final depth map generator 1708 may then determine a final depth map by computing a weighted sum of the preliminary depth maps generated in image analyzer 1704 and the class probabilities computed in class probability calculator 1706 for the object classes.

Based on the final generated depth map and the received 2D image, image rendering engine 1710 may create a 3D image, according to configuration information acquired from, e.g., image database 1702, as previously presented. After the 3D image is generated, image rendering engine 1710 may render the 3D image for output, e.g., display, printing, etc.

The 2D-to-3D image converter 106 may be used to generate depth maps for any 2D images and video sequences, including digital pictures taken by 2D cameras, videos taken by 2D video cameras, live broadcast, DVD/Blue-ray disc, and any other digital media. The depth maps may be used to render 3D on 3DTV, 3D photo frames, 3D monitors, 3D laptops, and 3D printing. The depth maps may also be used for multiview 3D rendering on autostereoscopic displays and TVs.

In some embodiments, during the above-described depth map generation and 2D-to-3D image conversion, each component of 2D-to-3D image converter 106 may store its computation/determination results in image database 1702 for later retrieval or training purpose. Based on the historic data, 2D-to-3D image converter 106 may train itself for improved performance.

The methods disclosed herein may be implemented as a computer program product, i.e., a computer program tangibly embodied in a non-transitory information carrier, e.g., in a machine-readable storage device, or a tangible non-transitory computer-readable medium, for execution by, or to control the operation of, data processing apparatus, e.g., a programmable processor, a computer, or multiple computers. A computer program may be written in any form of programming language, including compiled or interpreted languages, and it may be deployed in any form, including as a standalone program or as a module, component, subroutine, or other unit suitable for use in a computing environment. A computer program may be deployed to be executed on one computer or on multiple computers at one site or distributed across multiple sites and interconnected by a communication network.

A portion or all of the methods disclosed herein may also be implemented by an application-specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing depth map generation for 2D-to-3D image conversion based on the soft classification method disclosed herein.

In the preceding specification, the invention has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A computer-implemented method for generating a depth map for a 2D image, the method comprising:
   receiving the 2D image;
   defining a plurality of object classes;
   analyzing content of the received 2D image by computing preliminary depth maps for the plurality of object classes based on features in the received 2D image and corresponding object class properties;
   calculating probabilities that the received 2D image belongs to the object classes; and
   determining a final depth map based on a result of the analyzed content and the calculated probabilities for the object classes.

2. The method of claim 1, wherein analyzing content comprises:
   acquiring a set of visual features from the received 2D image; and
   comparing the received 2D image with the object classes based on the acquired set of visual features.

3. The method of claim 1, wherein determining a final depth map comprises:
   computing the final depth map as a weighted sum of the preliminary depth maps and the calculated probabilities for the object classes.

4. The method of claim 3, wherein computing the final depth map comprises:
   calculating the products of the calculated probabilities and the preliminary depth maps for each of the object classes; and
   summing the products for each of the object classes.

5. The method of claim 1, further comprising:
   if there are exactly two object classes in the plurality of object classes:
      performing a single stage two-class classification of the received 2D image; and
      calculating the probabilities for the two object classes in a single stage.

6. The method of claim 1, further comprising:
   if there are more than two object classes in the plurality of object classes:
      performing a multi-stage two-class classification of the received 2D image;
      calculating the probabilities for a first two object classes in a first stage;
      calculating the probabilities for other object classes calculated in subsequent stages; and
      combining the calculated probabilities to determine the probabilities that the received 2D image belongs to each of a plurality of combinations of object classes from the different stages.

7. The method of claim 6, wherein performing a multi-stage two-class classification of the received 2D image comprises:
   performing a two-stage two-class classification by:
      executing a first stage classification by:
         calculating the probability that the received 2D image belongs to a first object class; and
         calculating the probability that the received 2D image belongs to a second object class;
      executing a second stage classification by:
         calculating the probability that the received 2D image belongs to a third object class; and
         calculating the probability that the received 2D image belongs to a fourth class; and
      combining the probabilities calculated in the first and second stage classifications.

8. The method of claim 7, wherein combining the probabilities calculated in the first and second stage classifications comprises:

calculating, in the first and second stage classifications, the probability that the received 2D image belongs to each of a plurality of combinations of object classes.

9. The method of claim 1, comprising receiving a plurality of 2D images.

10. A computer-implemented method for generating a depth map for a 2D image, the method comprising:
   receiving the 2D image;
   defining a plurality of object classes, wherein the object classes comprise:
      a landscape class;
      a city class;
      an indoor class; and
      a portrait class;
   analyzing content of the received 2D image;
   calculating probabilities that the received 2D image belongs to the object classes; and
   determining a final depth map based on a result of the analyzed content and the calculated probabilities for the object classes.

11. A computer-implemented method for generating a depth map for a 2D image, the method comprising:
   receiving the 2D image;
   defining a plurality of object classes;
   analyzing content of the received 2D image;
   calculating probabilities that the received 2D image belongs to the object classes;
   determining a final depth map based on a result of the analyzed content and the calculated probabilities for the object classes; and
   applying an infinite impulse response filter to smooth the calculated probabilities for the object classes if the received 2D image is a single image of a fast action scene.

12. A computer-implemented method for generating a depth map for a 2D image, the method comprising:
   receiving the 2D image;
   defining a plurality of object classes;
   analyzing content of the received 2D image;
   calculating probabilities that the received 2D image belongs to the object classes;
   determining a final depth map based on a result of the analyzed content and the calculated probabilities for the object classes; and
   calculating the probability that the received 2D image belongs to each of a plurality of combinations of the object classes by determining the product of a calculated probability for each object class of the object classes in each of a plurality of combinations of the object classes.

13. A system for generating a depth map for a received 2D image, the system comprising:
   a user computing device; and
   a non-transitory computer-readable medium operatively coupled to the user computing device via one or more networks and storing an image converter, the image converter comprising;
      an image content analyzer to analyze content of the received 2D image;
      a class probability calculator to calculate the probability that the received 2D image belongs to each of a plurality of object classes;
      a depth map generator to compute preliminary depth maps for the object classes using configuration information stored in an image database and
      a final depth map generator to determine a final depth map based on a result of the analyzed content and the calculated probabilities for the object classes.

14. The system of claim 13, wherein the image converter further comprises:
   an image database to store configuration information pertaining to the object classes for analyzing content of the received 2D image.

15. The system of claim 14, wherein the image converter further comprises:
   an image database to store configuration information pertaining to properties corresponding to the object classes.

16. A system for generating a depth map for a received 2D image, the system comprising:
   a user computing device; and
   a non-transitory computer-readable medium operatively coupled to the user computing device via one or more networks and storing an image converter, the image converter comprising;
      an image content analyzer to analyze content of the received 2D image;
      a class probability calculator to calculate the probability that the received 2D image belongs to each of a plurality of object classes;
      a final depth map generator to determine a final depth map based on a result of the analyzed content and the calculated probabilities for the object classes; and
      an infinite impulse response filter to smooth the calculated probabilities for the object classes if the received 2D image is a single image of a fast action scene.

17. A non-transitory computer-readable medium storing instructions that, when executed, causes a computer to perform a method for generating a depth map for a 2D image, the method comprising:
   receiving the 2D image;
   defining a plurality of object classes;
   analyzing content of the received 2D image by computing preliminary depth maps for the plurality of object classes based on features in the received 2D image and corresponding object class properties;
   calculating probabilities that the received 2D image belongs to the object classes; and
   determining a final depth map based on a result of the analyzed content and the calculated probabilities for the object classes.

* * * * *